US012120262B2

(12) United States Patent
Albero et al.

(10) Patent No.: US 12,120,262 B2
(45) Date of Patent: *Oct. 15, 2024

(54) VOICE ANALYSIS PLATFORM FOR VOICEPRINT TRACKING AND ANOMALY DETECTION

(71) Applicant: Bank of America Corporation, Charlotte, NC (US)

(72) Inventors: George Albero, Charlotte, NC (US); Youshika C. Scott, Charlotte, NC (US); Brian H. Corr, Charlotte, NC (US); Thomas G. Frost, Charlotte, NC (US); Scott Nielsen, Charlotte, NC (US); Charlene L. Ramsue, Statesville, NC (US)

(73) Assignee: Bank of America Corporation, Charlotte, NC (US)

( * ) Notice: Subject to any disclaimer, the term of this patent is extended or adjusted under 35 U.S.C. 154(b) by 148 days.

This patent is subject to a terminal disclaimer.

(21) Appl. No.: 17/954,422

(22) Filed: Sep. 28, 2022

(65) Prior Publication Data

US 2023/0016130 A1 Jan. 19, 2023

Related U.S. Application Data

(63) Continuation of application No. 17/101,171, filed on Nov. 23, 2020, now Pat. No. 11,522,994.

(51) Int. Cl.
*H04M 3/22* (2006.01)
*G10L 17/04* (2013.01)
(Continued)

(52) U.S. Cl.
CPC ........... *H04M 3/2281* (2013.01); *G10L 17/04* (2013.01); *G10L 17/06* (2013.01); *G10L 25/90* (2013.01);
(Continued)

(58) Field of Classification Search
CPC .......... H04M 3/2281; H04M 3/42042; H04M 3/5175; H04M 3/5183; H04M 2201/41;
(Continued)

(56) References Cited

U.S. PATENT DOCUMENTS 3,796,088 A 3/1974 Gustafsson et al.
6,356,868 B1 3/2002 Yuschik et al.
(Continued)

OTHER PUBLICATIONS

May 6, 2022—(US) Non-Final Office Action—U.S. Appl. No. 17/101,171.
Aug. 19, 2022 Notice of Allowance U.S. Appl. No. 17/101,171.

*Primary Examiner* — Akelaw Teshale
(74) *Attorney, Agent, or Firm* — Banner & Witcoff, Ltd.

(57) ABSTRACT

Aspects of the disclosure relate to voiceprint tracking and anomaly detection. A computing platform may detect voice information from a call management system. The computing platform may establish voiceprints for employees and clients of an enterprise. The computing platform may detect a call between an employee and a caller attempting to access a client account. The computing platform may identify a first voiceprint corresponding to the employee and a second voiceprint corresponding to the caller. The computing platform may compare the second voiceprint to a known voiceprint corresponding to the client. Based on the comparison of the second voiceprint to the known voiceprint, the computing platform may determine that the second voiceprint does not match the known voiceprint. The computing platform may identify that the second voiceprint corresponds to another employee of the enterprise, and may send a security notification indicating potential unauthorized account access to an enterprise computing device.

20 Claims, 11 Drawing Sheets

(51) Int. Cl.
*G10L 17/06* (2013.01)
*G10L 25/90* (2013.01)
*H04M 3/42* (2006.01)
*H04M 3/51* (2006.01)

(52) U.S. Cl.
CPC ..... *H04M 3/42042* (2013.01); *H04M 3/5175* (2013.01); *H04M 3/5183* (2013.01); *H04M 2201/41* (2013.01)

(58) Field of Classification Search
CPC ........... H04M 2203/6054; G10L 17/04; G10L 17/06; G10L 25/90; G10L 17/00; G06Q 20/108; G06Q 20/305; G06Q 20/384; G06Q 20/40145; G06Q 20/4015; G06Q 20/4016; G06Q 20/405; H04L 63/0861; G06F 21/32
See application file for complete search history.

(56) References Cited

U.S. PATENT DOCUMENTS

| | | | |
|---|---|---|---|
| 7,191,129 B2 | 3/2007 | Brown et al. | |
| 7,415,456 B2 | 8/2008 | Benco et al. | |
| 8,416,181 B2 | 4/2013 | Yamashita et al. | |
| 9,215,321 B2 | 12/2015 | Timem et al. | |
| 9,609,134 B2 | 3/2017 | Timem et al. | |
| 9,628,615 B2 | 4/2017 | Bangor et al. | |
| 9,665,643 B2 | 5/2017 | Li et al. | |
| 9,699,303 B2 | 7/2017 | Hodge | |
| 9,728,191 B2 | 8/2017 | Dalmasso et al. | |
| 9,848,082 B1 | 12/2017 | Lillard et al. | |
| 10,032,454 B2 | 7/2018 | Zhang et al. | |
| 10,289,961 B2 | 5/2019 | Lakshmanan et al. | |
| 10,313,344 B2 | 6/2019 | Sims et al. | |
| 10,409,797 B2 | 9/2019 | Murgai | |
| 10,593,334 B2 | 3/2020 | Xiong | |
| 10,629,209 B2 | 4/2020 | Wang et al. | |
| 10,657,969 B2 | 5/2020 | Shi et al. | |
| 10,685,658 B2 | 6/2020 | Li et al. | |
| 10,692,501 B2 | 6/2020 | Ziv et al. | |
| 10,699,716 B2 | 6/2020 | Li et al. | |
| 10,714,094 B2 | 7/2020 | Ling | |
| 10,715,522 B2 | 7/2020 | Lew | |
| 10,721,351 B2 | 7/2020 | Hodge | |
| 10,777,206 B2 | 9/2020 | Liu et al. | |
| 11,075,930 B1 | 7/2021 | Xavier et al. | |
| 11,076,043 B2 | 7/2021 | Jolly et al. | |
| 2001/0043714 A1 | 11/2001 | Asada et al. | |
| 2005/0002537 A1 | 1/2005 | Azima et al. | |
| 2005/0102502 A1* | 5/2005 | Sagen | H04L 9/3231 379/202.01 |
| 2007/0228893 A1 | 10/2007 | Yamauchi et al. | |
| 2011/0026271 A1 | 2/2011 | Doo et al. | |
| 2012/0034954 A1 | 2/2012 | Tabe | |
| 2012/0311703 A1 | 12/2012 | Yanovsky et al. | |
| 2014/0348308 A1 | 11/2014 | Krause | |
| 2014/0376703 A1* | 12/2014 | Timem | H04M 3/527 379/88.02 |
| 2015/0192824 A1 | 7/2015 | Hirota | |
| 2015/0195657 A1 | 7/2015 | Ishihara et al. | |
| 2016/0125884 A1* | 5/2016 | Timem | H04L 63/102 704/273 |
| 2016/0142534 A1* | 5/2016 | Guerra | G10L 17/00 379/88.02 |
| 2017/0061968 A1* | 3/2017 | Dalmasso | G10L 17/08 |
| 2018/0332406 A1 | 11/2018 | Park et al. | |
| 2019/0014143 A1 | 1/2019 | Syme et al. | |
| 2020/0059733 A1 | 2/2020 | Shin et al. | |
| 2020/0211571 A1 | 7/2020 | Shoa et al. | |
| 2021/0105358 A1* | 4/2021 | Jolly | G10L 25/60 |
| 2021/0173487 A1 | 6/2021 | Ham | |

* cited by examiner

Internal Security Interface

Your enterprise permissions have been temporarily suspended. Please contact information technology to confirm your identity.

FIG. 4

External Security Interface

Suspicious activity has been detected on your account, and your account has been temporarily locked. Please contact customer service for additional details and to provide additional authentication.

FIG. 5

VOICE ANALYSIS PLATFORM FOR VOICEPRINT TRACKING AND ANOMALY DETECTION

CROSS REFERENCE TO RELATED APPLICATIONS

This application is a continuation of and claims priority to co-pending U.S. application Ser. No. 17/101,171, filed Nov. 23, 2020, and entitled "Voice Analysis Platform For Voiceprint Tracking and Anomaly Detection," which is incorporated herein by reference in its entirety.

BACKGROUND

Aspects of the disclosure relate to voiceprint tracking and anomaly detection. In some cases, individuals (such as clients of a financial institution) may use one or more methods of voice communication to interact with employees of the financial institution (e.g., to request customer service, perform one or more tasks, and/or otherwise receive employee assistance). In some instances, however, employees of the financial institution may be positioned to impersonate voices of clients and/or other employees to gain unauthorized account access and/or perform one or more other unauthorized functions. Without a method for voice identification/verification, the financial institution may be unable to verify caller identity. Furthermore, the financial institution may be unable to identify such impersonation based on voice information alone, especially where the impersonation occurs across numerous locations (e.g., numerous branch locations of the financial institution). This may result in unauthorized account access by internal bad actors, which may erode client trust of security measures imposed by the financial institution.

SUMMARY

Aspects of the disclosure provide effective, efficient, scalable, and convenient technical solutions that address and overcome the technical problems associated with voice analysis and anomaly detection. In accordance with one or more embodiments of the disclosure, a computing platform comprising at least one processor, a communication interface, and memory storing computer-readable instructions may detect voice information from a call management system. The computing platform may establish voiceprints for one or more employees of an enterprise organization corresponding to the call management system. The computing platform may establish voiceprints for one or more clients of the enterprise organization corresponding to the call management system. The computing platform may monitor the call management system to detect a voice call session between an employee and a caller attempting to access an account linked to a client. Based on the voice call session, the computing platform may identify a first voiceprint corresponding to the employee and a second voiceprint corresponding to the caller. The computing platform may compare the second voiceprint corresponding to the caller to a known voiceprint corresponding to the client. Based on the comparison of the second voiceprint corresponding to the caller to the known voiceprint corresponding to the client, the computing platform may determine that the second voiceprint corresponding to the caller does not match the known voiceprint corresponding to the client. Based on the second voiceprint corresponding to the caller, the computing platform may identify that the second voiceprint corresponding to the caller corresponds to another employee of the enterprise organization. The computing platform may send, to an enterprise computing device, a security notification indicating potential unauthorized account access and one or more commands directing the enterprise computing device to display the security notification, which may cause the enterprise computing device to display the security notification.

In one or more instances, the computing platform may establish the voiceprints for the one or more employees and the voiceprints for the one or more clients based on one or more of a pitch, a tone, a stutter, a rate of speech, a speech pattern, or an intonation included in subsets of the voice information corresponding to each of the one or more employees and the one or more clients. In one or more instances, in response to identifying that the second voiceprint corresponding to the caller corresponds to the other employee of the enterprise organization, the computing platform may initiate a claim against the other employee.

In one or more instances, in response to identifying that the second voiceprint corresponding to the caller corresponds to the other employee of the enterprise organization, the computing platform may revoke enterprise permissions corresponding to the other employee. In one or more instances, the computing platform may identify an additional voice call session that corresponds to the second voiceprint. The computing platform may identify additional voiceprints corresponding to the additional voice call session. The computing platform may store linkage information linking the second voiceprint to the additional voiceprints.

In one or more instances, the computing platform may monitor the call management system to detect additional voice call sessions corresponding to the additional voiceprints. The computing platform may flag requests corresponding to the additional voice call sessions as suspicious. In one or more instances, the employee may correspond to a first location of the enterprise organization, and the additional voice call sessions may correspond to other locations, different than the first location, of the enterprise organization.

In one or more instances, the computing platform may identify transactions processed by the other employee and flag the identified transactions for further review. In one or more instances, the computing platform may compare the first voiceprint corresponding to the employee to a known voiceprint corresponding to the employee. The computing platform may detect voice anomalies corresponding to the employee by: 1) determining, based on the comparison of the first voiceprint corresponding to the employee to the known voiceprint corresponding to the employee, that the first voiceprint corresponding to the employee does not match the known voiceprint corresponding to the employee, and 2) identifying that the first voiceprint corresponding to the employee does not match one of the voiceprints for the one or more employees of the enterprise organization. In one or more instances, in response to detecting the voice anomalies, the computing platform may: 1) revoke enterprise permissions corresponding to the employee, and 2) prompt for re-authentication by the employee to re-instate the revoked enterprise permissions.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4 and 5 depict illustrative graphical user interfaces that implement voiceprint tracking and anomaly detection in accordance with one or more example embodiments.

DETAILED DESCRIPTION

Figure 1A:
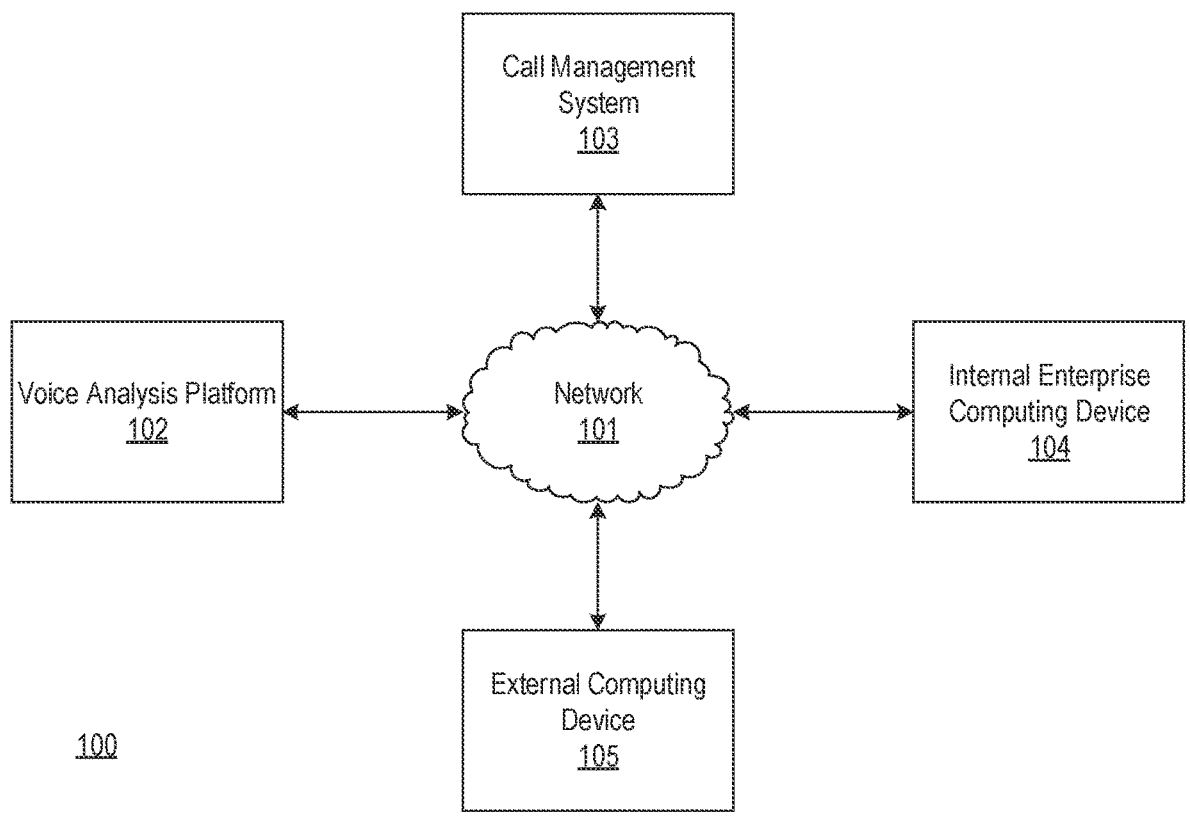
FIGS. 1A and 1B depict an illustrative computing environment for implementing voiceprint tracking and anomaly detection in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe voice analysis and anomaly detection. For example, organizations (such as financial institutions) may be trusted by customers to protect customer assets. Breaches of such trust, especially insider threats caused by employees of these organizations may inflict considerable reputational damage to the organizations. Similarly, organizations may take protective measures to ensure integrity of customer accounts from external actors. Accordingly, the disclosure herein describes a forensic retrieval mechanism to mitigate internal and external fraud risks. For example, voiceprints may be used to facilitate identification and evidence of internal bad actors and to verify customers accessing their accounts.

To do so, voice biometrics (e.g., voiceprints) may be captured for customers and employees, and unique identifiers may be created accordingly. Voiceprint sources may be utilized to assess inbound auditory interactions (both voice response unit (VRU) or agent communications) for a voiceprint match. When a match is identified, systems may capture a full audio recording of a voice interaction, account numbers, call automatic number identification (ANI) and/or internet protocol (IP) address, interaction start date-time, interaction end date-time, servicing employee VRU identification, servicing type (e.g., addressing maintenance), matching associate voiceprint identifier, and/or other information. In doing so, a repository may generated that may allow for identification of high velocity matches to a voiceprint, which may, e.g., be a leading risk indicator of an internal fraud event.

In some instances, voice biometrics may be unique enough to accurately isolate a person's identity. Creating a repository of associate voice biometrics, may enable organizations to identify associates engaging in servicing interactions for accounts they do not own. This may provide the ability to quickly respond to internal embezzlement events and firm evidence to adjudicate such incidents when they occur. One or more of the systems described herein may perform voice match, stress analysis, and/or real-time identification of disparate voiceprints that may trigger deeper authentication, account alerts, disparate voiceprint links to other account interactions and audio recordings, all of which may be archived for real-time retrieval. The archive would allow for fraud event links, which may enable easier investigation and solidify evidence for prosecution.

In some instances, one or more of the systems described herein may utilize artificial intelligence to search the repository for other anomalies in voiceprints to detect patterns of fraud occurring in a particular financial center, region, or with an associate. This artificial intelligence component may use predictive analysis to assess where the next fraud event may occur. Furthermore, the artificial intelligence component may perform link analysis to determine ties between seemingly disparate fraud events and possibly revealing an insider threat.

Figure 1B:
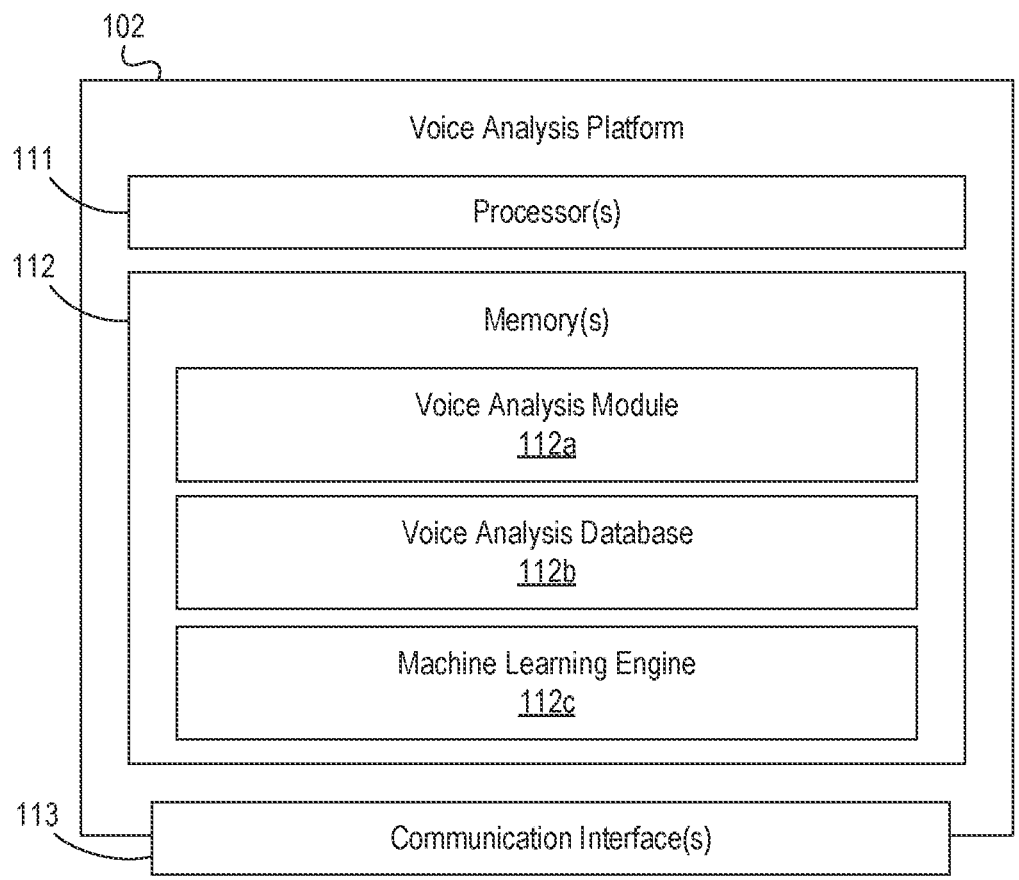

FIGS. 1A-1B depict an illustrative computing environment that implements voiceprint tracking and anomaly detection in accordance with one or more example embodiments. Referring to FIG. 1A, computing environment 100 may include one or more computer systems. For example, computing environment 100 may include a voice analysis platform 102, a call management system 103, an internal enterprise computing device 104, and an external computing device 105.

As described further below, voice analysis platform 102 may be a computer system that includes one or more computing devices (e.g., servers, server blades, or the like) and/or other computer components (e.g., processors, memories, communication interfaces) that may be used to generate voiceprints for enterprise employees and customers, monitor voice call sessions to compare detected voiceprints with anticipated voiceprints, and to initiate one or more security actions if a match is not detected.

Call management system 103 may be a computer system that includes one or more computing devices (e.g., servers, server blades, or the like) and/or other computer components (e.g., processors, memories, communication interfaces) that may be used to manage requests to establish voice call sessions and/or other communication sessions (e.g., voice over IP, text chat sessions, and/or other methods of communications) from enterprise clients. For example, the call management system 103 may route the requests for processing by enterprise employees.

Internal enterprise computing device 104 may be a laptop computer, desktop computer, mobile device, tablet, smartphone, or the like that may be used by an individual such as an employee of an enterprise organization (e.g., a financial institution, or the like). For example, the internal enterprise computing device 104 may be used by one or more individuals to communicate with a client of the enterprise organization (e.g., to process a transaction, provide account assistance, and/or otherwise provide client services). In some instances, internal enterprise computing device 104 may be configured to display one or more user interfaces (e.g., which may include security notifications, authentication prompts, and/or other alerts).

External computing device 105 may be a laptop computer, desktop computer, mobile device, tablet, smartphone, or the like that may be used by an individual such as a client of an enterprise organization (e.g., a financial institution, or the like). For example, the external computing device 105 may be used by one or more individuals to establish communication with an employee of the enterprise organization (e.g., to process a transaction, request account assistance, and/or otherwise communicate with the enterprise organization). In some instances, external computing device 105 may be configured to display one or more user interfaces (e.g., which may include security notifications, authentication prompts, and/or other alerts).

Computing environment 100 also may include one or more networks, which may interconnect voice analysis platform 102, call management system 103, internal enterprise computing device 104, and external computing device 105. For example, computing environment 100 may include a network 101 (which may interconnect, e.g., voice analysis platform 102, call management system 103, internal enterprise computing device 104, and external computing device 105).

In one or more arrangements, voice analysis platform 102, call management system 103, internal enterprise computing device 104, and external computing device 105 may be any type of computing device capable of sending and/or receiving requests and processing the requests accordingly. For example, voice analysis platform 102, call management system 103, internal enterprise computing device 104, external computing device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of voice analysis platform 102, call management system 103, internal enterprise computing device 104, and external computing device 105, may, in some instances, be special-purpose computing devices configured to perform specific functions.

Referring to FIG. 1B, voice analysis platform 102 may include one or more processors 111, memory 112, and communication interface 113. A data bus may interconnect processor 111, memory 112, and communication interface 113. Communication interface 113 may be a network interface configured to support communication between voice analysis platform 102 and one or more networks (e.g., network 101, or the like). Memory 112 may include one or more program modules having instructions that when executed by processor 111 cause voice analysis platform 102 to perform one or more functions described herein and/or one or more databases that may store and/or otherwise maintain information which may be used by such program modules and/or processor 111. In some instances, the one or more program modules and/or databases may be stored by and/or maintained in different memory units of voice analysis platform 102 and/or by different computing devices that may form and/or otherwise make up voice analysis platform 102. For example, memory 112 may have, host, store, and/or include voice analysis module 112a, voice analysis database 112b, and machine learning engine 112c.

Voice analysis module 112a may have instructions that direct and/or cause voice analysis platform 102 to execute advanced techniques to provide one or more voice analysis functions, such as establishing voiceprints and comparing identified voiceprints to anticipated voiceprints to identify or otherwise detect impersonation. Voice analysis database 112b may store information used by voice analysis module 112a and/or voice analysis platform 102 in application of advanced techniques to provide one or more voice analysis functions, and/or in performing other functions.

Figure 2A:
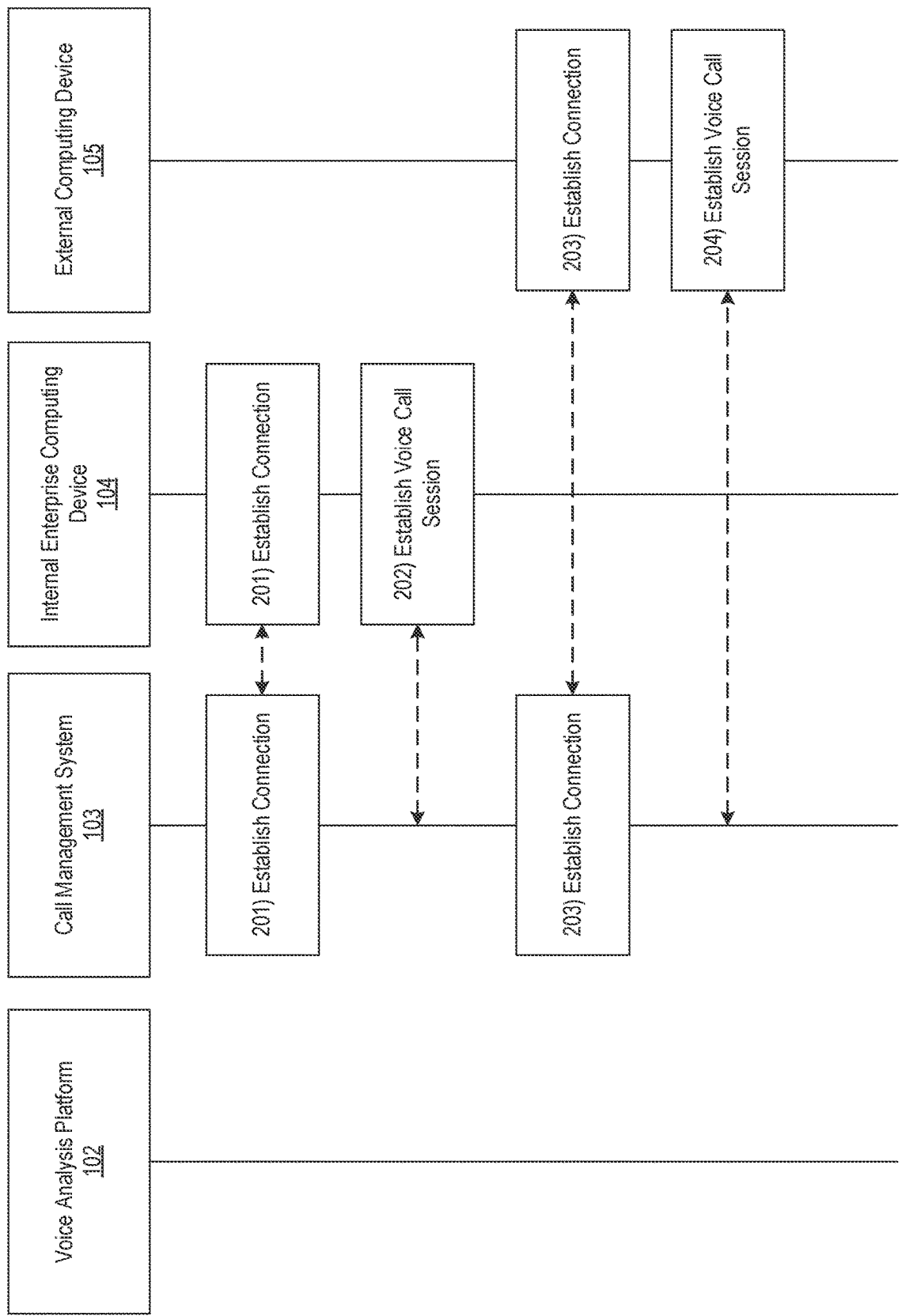
FIGS. 2A-2G depict an illustrative event sequence for implementing voiceprint tracking and anomaly detection in accordance with one or more example embodiments.

FIGS. 2A-2G depict an illustrative event sequence for voiceprint tracking and anomaly detection in accordance with one or more example embodiments. Referring to FIG. 2A, at step 201, internal enterprise computing device 104 may establish a connection with the call management system 103. For example, the internal enterprise computing device 104 may establish a first wireless data connection with the call management system 103 to link the internal enterprise computing device 104 to the call management system 103 (e.g., in preparation for establishing a communication session). In some instances, the internal enterprise computing device 104 may identify whether or not a connection is already established with the call management system 103. If a connection is already established with the call management system 103, the internal enterprise computing device 104 might not re-establish the connection. If a connection is not yet established with the call management system 103, the internal enterprise computing device 104 may establish the first wireless data connection as described herein.

At step 202, the internal enterprise computing device 104 may establish a communication session with the call management system (e.g., a voice call session, a voice over IP session, a video conferencing session, and/or other communication session that includes an audio component). For example, the call management system 103 may cause the internal enterprise computing device 104 to be linked or otherwise connected to another communication device (e.g., external computing device 105, or another communication device). For example, the internal enterprise computing device 104 may establish a communication session between an employee of an enterprise organization corresponding to the voice analysis platform 102 (e.g., who may be operating the internal enterprise computing device 104) and another individual (who may, e.g., be a client of the enterprise organization, a human resources representative, and/or other employee of the enterprise organization). In some instances, the internal enterprise computing device 104 may establish the voice communication session based on or in response to a request from a caller (e.g., requesting assistance with an account or other request for service). In some instances, the internal enterprise computing device 104 may establish the voice communication session as part of an onboarding process for the employee.

At step 203, the external computing device 105 may establish a connection with the call management system 103. For example, the external computing device 105 may establish a second wireless data connection with the call management system 103 to link the external computing device 105 to the call management system 103 (e.g., in preparation for establishing a communication session between the external computing device 105 and the call management system 103). In some instances, the external computing device 105 may identify whether or not a connection was previously established between the external computing device 105 and the call management system 103. If a connection was previously established, the computing device 105 might not re-establish the connection. If a connection is not yet established with the call management system 103, the external computing device 105 may establish the second wireless data connection as described herein.

At step 204, the external computing device 105 may establish a communication session with the call management system 103 (e.g., a voice call session, a voice over IP session, a video conferencing session, and/or other communication session that includes an audio component). For example, the call management system 103 may cause the external computing device 105 to be linked or otherwise connected to another communication device (e.g., internal enterprise computing device 104, or another communication device). For example, the external computing device 105 may establish a communication session between a caller (e.g., a user of the internal enterprise computing device 104 who may be a client of the enterprise organization corresponding to the voice analysis platform 102) and an employee of the enterprise organization. For example, the caller may request assistance from the enterprise organization, be participating in an onboarding process, and/or otherwise communicate with an employee of the enterprise organization. In some instances, rather than communicating with a live employee, the external computing device 105 may establish a communication session with an interactive voice response or otherwise automated voice response service.

Figure 2B:
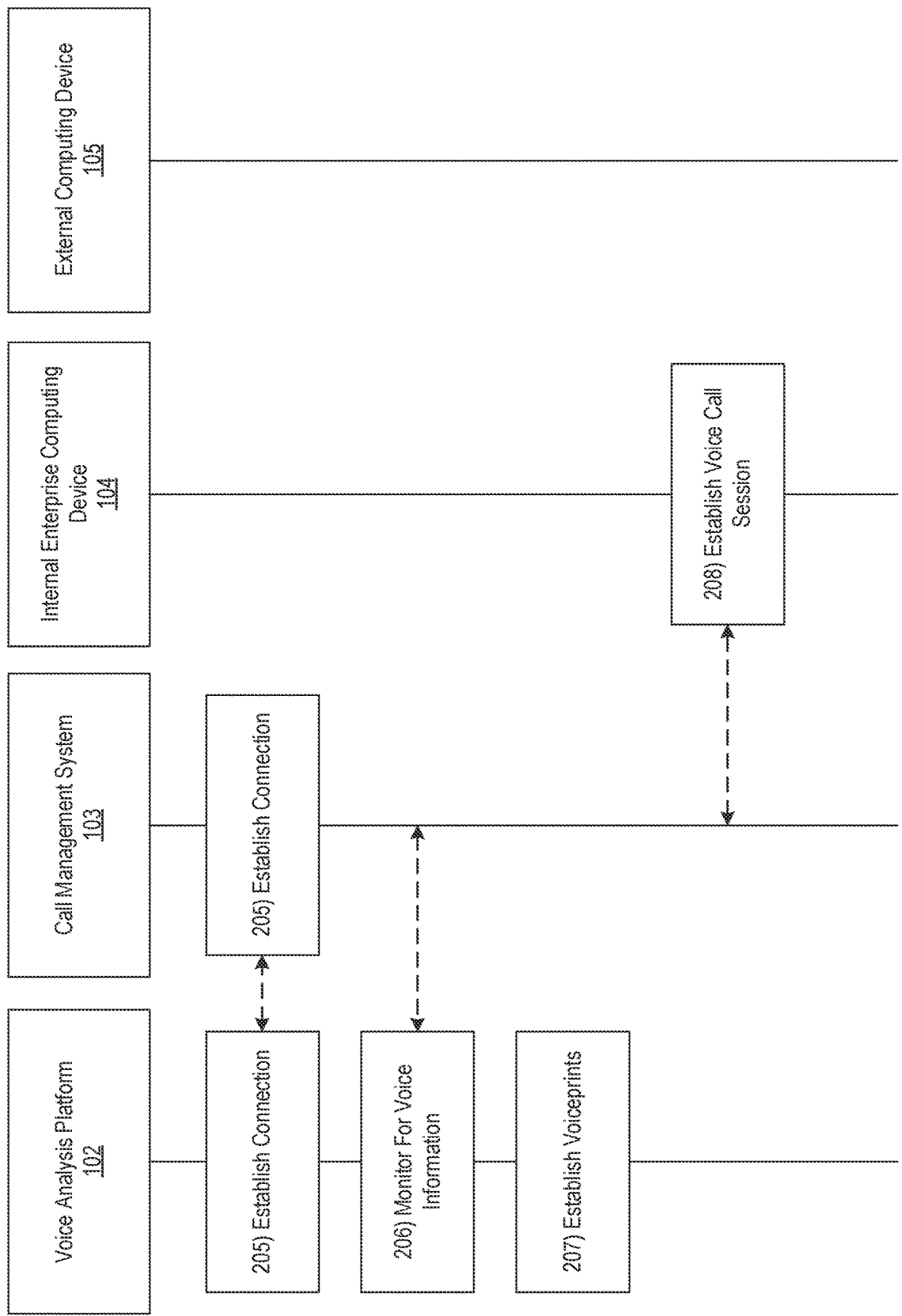

Referring to FIG. 2B, at step 205, the voice analysis platform 102 may establish a connection with the call management system 103. For example, the voice analysis platform 102 may establish a third wireless data connection with the call management system 103 to link the voice analysis platform 102 to the call management system 103 (e.g., which may enable the voice analysis platform 102 to monitor the call management system 103 to detect voice information corresponding to communication sessions). In some instances, the voice analysis platform 102 may identify whether or not a connection is already established with the call management system 103. If the voice analysis platform 102 identifies that a connection is already established with the call management system 103, the voice analysis platform 102 might not re-establish the connection. If a connection is not yet established with the call management system 103, the voice analysis platform 102 may establish the third wireless data connection as described herein.

At step 206, the voice analysis platform 102 may monitor the call management system 103 to detect voice information (e.g., corresponding to various voice communication sessions). For example, the voice analysis platform 102 may detect voice information corresponding to voice communication sessions established by the internal enterprise computing device 104, external computing device 105, and/or other internal/external devices (e.g., the voice call sessions established at steps 202 and 204). In some instances, in detecting the voice information, the voice analysis platform 102 may detect a pitch, a tone, a stutter, a rate of speech, a speech pattern, an intonation, and/or other information corresponding to various speakers participating in communication sessions.

In some instances, in detecting the voice information, the voice analysis platform 102 may analyze voice information corresponding to a communication session between a new employee and a human resources representative (e.g., during an onboarding process). For example, in some instances, as part of an onboarding process, each new employee may be prompted to read a particular statement, which may be used to identify a voiceprint. Additionally or alternatively, the voice analysis platform 102 may analyze voice information corresponding to internal and/or external communications between an employee and other employees/clients. Additionally or alternatively, in detecting the voice information, the voice analysis platform 102 may analyze voice information corresponding to communication sessions between an employee and another employee in relation to an account corresponding to the employee (e.g., the employee may be both an employee and a customer—for example, he or she may have one or more accounts with the financial institution). Additionally or alternatively, the voice analysis platform 102 may receive and analyze voice information from other institutions (e.g., other financial institutions). For example, other financial institutions may collect voice information similar to the voice information described above, and may share this voice information with other institutions (e.g., to create a universal database for financial institutions that may be used to prevent impersonation between institutions).

At step 207, based on the voice information detected at step 206, the voice analysis platform 102 may establish voiceprints for various individuals (e.g., employees, clients, and/or other individuals). For example, the voice analysis platform 102 may store a relation between a particular individual (e.g., a phone number, name, IP address, and/or other identifier) and their corresponding voice information (e.g., detected at step 206). For example, the voice analysis platform 102 may store a pitch, a tone, a stutter, a rate of speech, a speech pattern, an intonation, and/or other information for known employees and clients. In some instances, the voice analysis platform 102 may establish the voiceprints for the purpose of identifying impersonation during communication sessions. As a particular example, the voice analysis platform 102 may be able to use the voiceprints to identify that an employee is impersonating a client to obtain account access as described below.

By establishing these voiceprints, the voice analysis platform 102 may provide computing and processing efficiencies. For example, by creating a single voice spectrogram for each individual, the voice analysis platform 102 may merely scan other communication information to identify a match in the spectrogram (e.g., in contrast to attempting to compare hours of stored voice information to new voice information and attempting to identify similarities/patterns between the two). In doing so, the voice analysis platform 102 may identify call participants while conserving computing power.

At step 208, the internal enterprise computing device 104 may establish a first communication session with the call management system 103. In some instances, the internal enterprise computing device 104 may establish the first communication session using the same medium as used in establishing an original voiceprint for the user of the internal enterprise computing device 104 (e.g., both phone calls). In other instances, the internal enterprise computing device 104 may establish the first communication session using a different medium than the one used to establish the original voiceprint for the user of the internal enterprise computing device (e.g., voiceprint established from a phone call, and then a voice over IP session established at step 208). For illustrative purposes, it may be assumed that the internal enterprise computing device 104 may establish the first communication session in response to a request by an employee (e.g., a user of the internal enterprise computing device 104) for the purpose of providing assistance to a client, communicating with another employee, receiving assistance with regard to the employee's account, and/or another lawful and/or authorized reason for communicating with or on behalf of the financial institution (e.g., in contrast to the second voice call session, which is described further below at step 212).

Figure 2C:
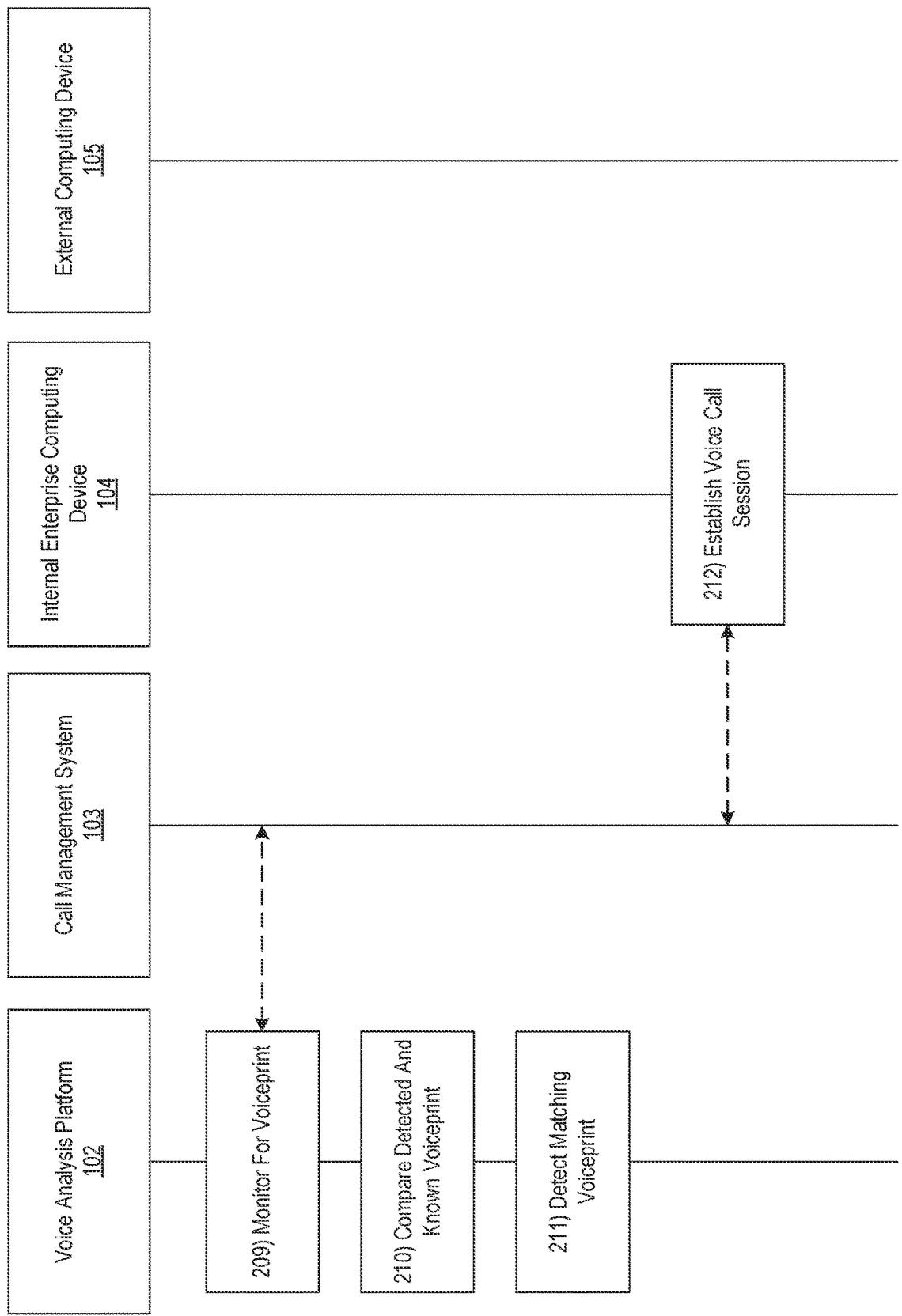

Referring to FIG. 2C, at step 209, the voice analysis platform 102 may monitor the call management system 103 to detect a voiceprint corresponding to the first communication session established at step 208. For example, the voice analysis platform 102 may identify features such as a pitch, a tone, a stutter, a rate of speech, a speech pattern, an intonation, and/or other information corresponding to each participant in the first communication session.

At step 210, the voice analysis platform 102 may compare the voiceprints identified at step 209 with known voiceprints corresponding to participants in the first communication session. For example, based on a user identifier corresponding to the first communication session (e.g., a phone number, customer account, IP address and/or other identifier) for an employee and/or a client, the voice analysis platform 102 may identify an anticipated voiceprint (e.g., of the voiceprints established at step 207). The voice analysis platform 102 may then compare the identified voiceprints with the anticipated voiceprint to identify whether or not there is a match (or the comparison results in a similarity between the two voiceprints that is within a predetermined similarity threshold).

At step 211, the voice analysis platform 102 may identify, based on the comparison performed at step 210, that the identified voiceprint matches the anticipated voiceprint. In these instances, the voice analysis platform 102 may determine that the first communication session established at step 208 does not include potential impersonation. For example, the voice analysis platform 102 may confirm an identify of an employee and/or client participating in the voice call session. In these instances, the voice analysis platform 102 may allow the first communication session to occur without imposing supplementary security measures. In some instances, if the voice analysis platform 102 confirms that the identified voiceprint matches the anticipated voiceprint, it may update or otherwise reinforce one or more voiceprint models to indicate a match between the identified and anticipated voiceprints.

In some instances, the analysis of the first communication session, described above at steps 208-211, may be performed in real time during the first communication session. Additionally or alternatively, the analysis of the first communication session may occur once the first communication session has been completed (e.g., based on a recording of the first communication session).

At step 212, the internal enterprise computing device 104 may establish a second communication session with the call management system 103. Although the second communication session established is illustrated with regard to the internal enterprise computing device 104, in some instances, the second communication session may be established by a different computing device without departing from the scope of this disclosure (e.g., another internal computing device or an external computing device). For example, the second communication session is shown with regard to internal enterprise computing device 104 merely for illustrative purposes. In some instances, the internal enterprise computing device 104 may establish the second communication session using the same medium as used in establishing an original voiceprint for the user of the internal enterprise computing device 104 (e.g., both phone calls). In other instances, the internal enterprise computing device 104 may establish the second communication session using a different medium than the one used to establish the original voiceprint for the user of the internal enterprise computing device (e.g., voiceprint established at step 207 based on a phone call, and then the second communication session may be a voice over IP session).

For illustrative purposes, it may be assumed that the internal enterprise computing device 104 may establish the second communication session in response to a request by an employee (e.g., a user of the internal enterprise computing device 104) for the purpose of impersonating a client, employee, or other individual for an unlawful and/or otherwise unauthorized reason (e.g., in contrast to the first voice call session, which is described above at step 208).

Figure 2D:
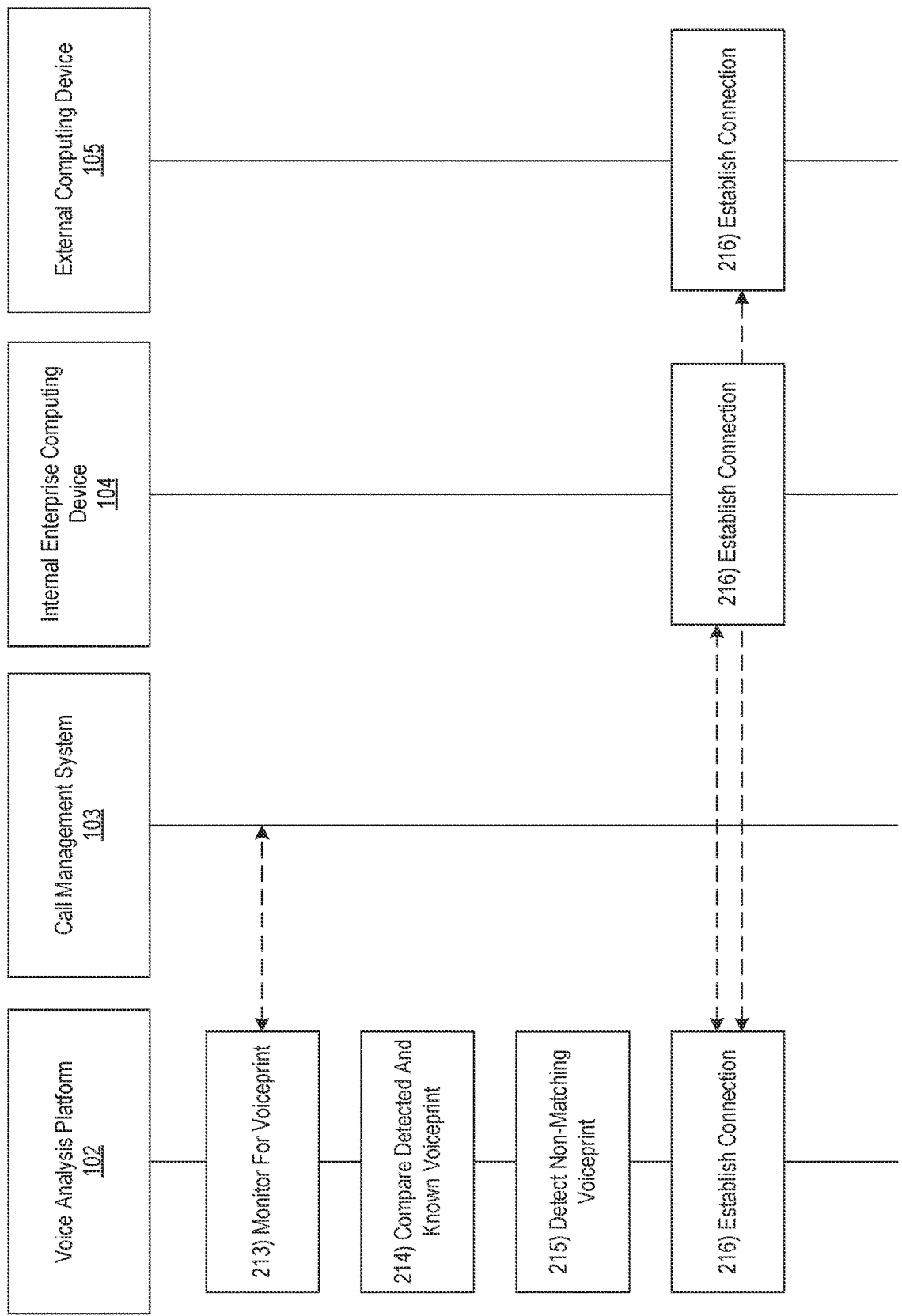

Referring to FIG. 2D, at step 213, the voice analysis platform 102 may monitor the call management system 103 to detect voiceprints corresponding to the second communication session. For example, the voice analysis platform 102 may identify features such as a pitch, a tone, a stutter, a rate of speech, a speech pattern, an intonation, and/or other information corresponding to each participant in the second communication session. In some instances, actions performed at step 213 may be similar to those described above with regard to step 209.

At step 214, the voice analysis platform 102 may compare the voiceprints identified at step 213 with known voiceprints corresponding to participants in the second communication session. For example, based on a user identifier corresponding to the communication session (e.g., a phone number, customer account, IP address and/or other identifier) for an employee and/or a client, the voice analysis platform 102 may identify an anticipated voiceprint (e.g., of the voiceprints established at step 207). The voice analysis platform 102 may then compare the identified voiceprints with the anticipated voiceprints to identify whether or not there is a match (or the comparison results in a similarity between the two voiceprints that is within a predetermined similarity threshold). In some instances, actions performed at step 214 may be similar to those described above with regard to step 210.

At step 215, the voice analysis platform 102 may identify, based on the comparison performed at step 215, that one or more of the identified voiceprints do not match the anticipated voiceprints. In these instances, the voice analysis platform 102 may determine that the second communication session includes a potential impersonation. For example, the voice analysis platform 102 may determine that a caller who established the voice call session (e.g., the employee operating internal enterprise computing device 104) is impersonating another individual (e.g., a client or an employee). In these instances, the voice analysis platform 102 may determine that one or more security measures should be imposed. For example, the voice analysis platform 102 may identify a client corresponding to the anticipated voiceprint, and may send one or more security notifications as described below. Similarly, the voice analysis platform 102 may identify, by comparing the identified voiceprint to the stored voiceprints, an identity of the impersonator. For example, the voice analysis platform 102 may identify that the identified voiceprint corresponds to another employee of the enterprise organization (who may e.g., be attempting to impersonate a client).

At step 216, the voice analysis platform 102 may establish connections with the internal enterprise computing device 104 and/or the external computing device 105. For example, the voice analysis platform 102 may establish fourth and/or fifth wireless data connections with the internal enterprise computing device 104 and the external computing device 105 to link the voice analysis platform 102 to the internal enterprise computing device 104 and/or the external computing device 105 (e.g., for the purpose of sending one or more security alerts, authentication prompts, and/or other notifications). In some instances, the voice analysis platform 102 may identify whether a connection is already established with the internal enterprise computing device 104 and/or the external computing device 105. If a connection is already established with the internal enterprise computing device 104 and/or the external computing device 105, the voice analysis platform 102 might not re-establish the connection. If a connection is not yet established with the internal enterprise computing device 104 and/or the external computing device 105, the voice analysis platform 102 may establish the fourth and/or fifth wireless data connections as described herein.

Figure 2E:
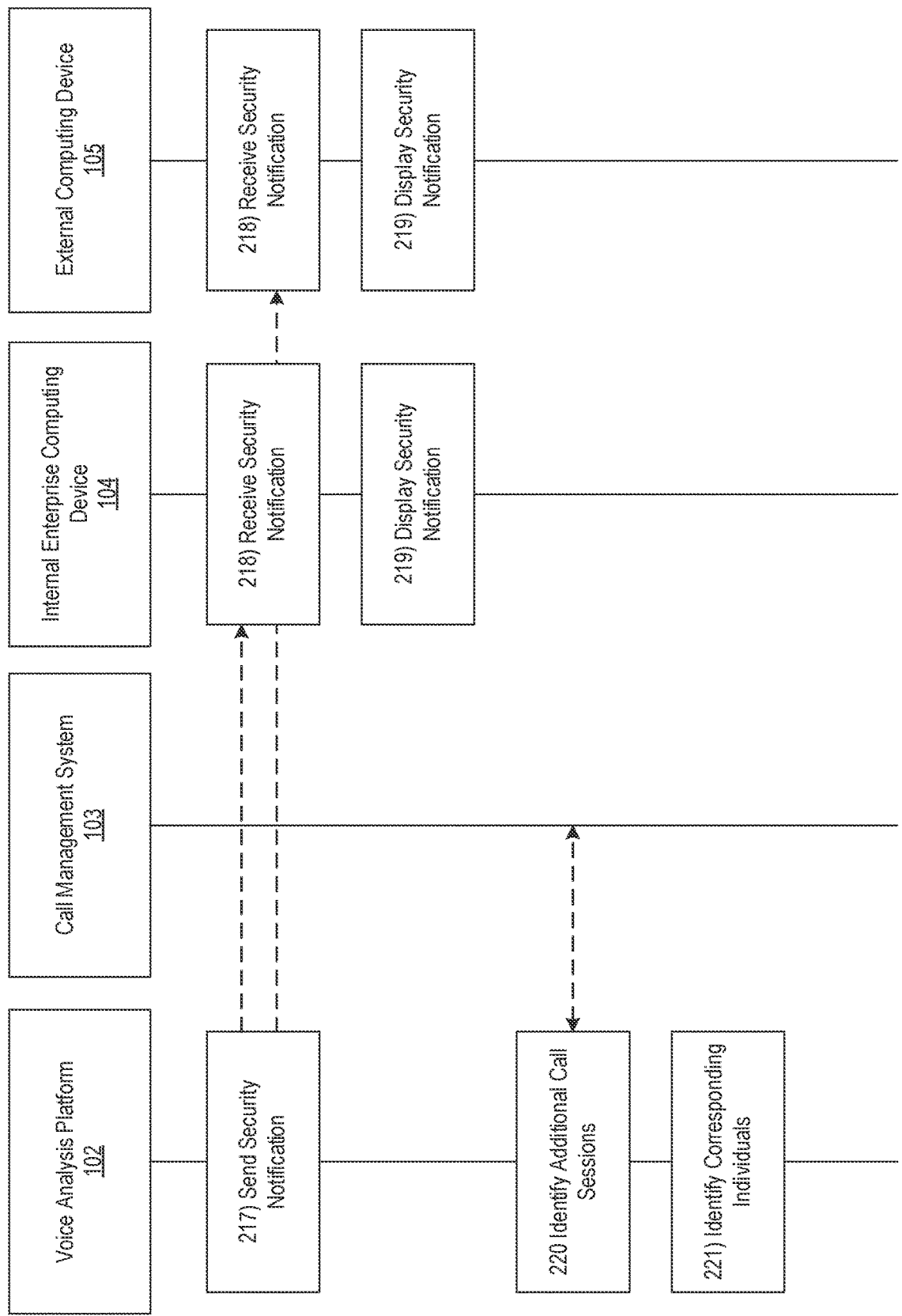

Referring to FIG. 2E, at step 217, the voice analysis platform 102 may send one or more security notifications to the internal enterprise computing device 104 and/or the external computing device 105. For example, the voice analysis platform 102 may send the one or more security notifications to the internal enterprise computing device 104 and/or the external computing device 105 via the communication interface 113 and while the fourth and/or fifth wireless data connections are established. In some instances, the voice analysis platform 102 may send, along with the one or more security notifications, one or more commands directing the internal enterprise computing device 104 and/ or the external computing device 105 to display the one or more security notifications.

At step 218, the internal enterprise computing device 104 and/or the external computing device 105 may receive the one or more security notifications sent at step 217. For example, the internal enterprise computing device 104 and/ or the external computing device 105 may receive the one or more security notifications while the fourth and/or fifth wireless data connections are established. In some instances, the internal enterprise computing device 104 and/or the external computing device 105 may receive, along with the one or more security notifications, the one or more commands directing the internal enterprise computing device 104 and/or the external computing device 105 to display the one or more security notifications.

At step 219, the internal enterprise computing device 104 and/or the external computing device 105 may display the one or more security notifications. For example, the internal enterprise computing device 104 may display a graphical user interface similar to graphical user interface 405, which is shown in FIG. 4. For example, the internal enterprise computing device 104 may display a notification that the employee's permissions have been temporarily suspended as a result of the potential impersonation that has been detected. Additionally or alternatively, the internal enterprise computing device 104 may prompt a user (e.g., the impersonating employee) to reauthenticate using credentials, multistep authentication, and/or other authentication information. Additionally or alternatively, the internal enterprise computing device 104 (or another internal enterprise computing device) may display a notification requesting initiation of a claim or proceeding against the impersonating employee (or alternatively the voice analysis platform 102 and/or internal enterprise computing device 104 may automatically initiate the claim).

Similarly, in displaying the one or more security notifications the external computing device 105 may display a graphical user interface similar to graphical user interface 505, which is shown in FIG. 5. For example, the external computing device 105 may display a notification that suspicious activity has been detected on the corresponding client's account, and that further confirmation and/or authentication may be required to unlock the account. In some instances, the notifications may be sent to a computing device corresponding to the account holder (e.g., the client). Additionally or alternatively, the notifications may be sent to a computing device corresponding to another individual, other than the account holder, who may be affiliated with the account holder (e.g., a caretaker, parent, next of kin, and/or other individual).

In some instances, the analysis of the second communication session, described above at steps 212-219, may be performed in real time during the second communication session. Additionally or alternatively, the analysis of the second communication session may occur once the second communication session has been completed (e.g., based on a recording of the second communication session).

At step 220, the voice analysis platform 102 may identify corresponding communication sessions. For example, the voice analysis platform 102 may identify additional communication sessions that include the voiceprint identified at step 215 (e.g., the voiceprint indicative of a potential bad actor who is impersonating another employee or client). For example, the voice analysis platform 102 may monitor these corresponding communication sessions (which may, in some instances, be of varied mediums) to detect communication sessions that include the voiceprint identified at step 215. In some instances, the voice analysis platform 102 may monitor both live and previously recorded communication sessions to identify conversations in which the impersonating employee participated.

For example, the voice analysis platform 102 may monitor other current and/or historical communication sessions to identify other individuals (e.g., other employees and/or clients) with which the potential bad actor has communicated. For example the voice analysis platform 102 may identify other voiceprints detected in the corresponding communication sessions and based on the voiceprints established at step 207, may identify identities of individuals corresponding to these voiceprints. In doing so, the voice analysis platform 102 may identify other accounts that may be compromised or otherwise insecure (e.g., because the potential bad actor may have impersonated individuals corresponding to these other voiceprints).

For example, the potential bad actor (e.g., who may be an employee of the financial institution), may have spoken with a first client in an authorized capacity. In this example, the voice analysis platform 102 may identify this first client based on a detected voiceprint, and may pre-empt unauthorized account access by the potential bad actor (e.g., who may subsequently attempt to impersonate the first client after hearing his or her voice). Additionally or alternatively, in identifying the other individuals with whom the potential bad actor has communicated, the voice analysis platform 102 may identify other bad actors within the financial institution. For example, the voice analysis platform 102 may identify that the potential bad actor communicates with another employee (with whom the potential bad actor would not otherwise be in regular contact with) more than a threshold number of times within a time period (e.g., a week, a month, or the like). As another example, the voice analysis platform 102 may simply flag any other employees with whom the potential bad actor has communicated, and review these communications to identify possible conspiracies between employees.

In some instances, the voice analysis platform 102 may analyze one or more layers of communication sessions beyond those described above. For example, the voice analysis platform 102 may identify individuals who have communicated with the potential bad actor (as described in the preceding paragraph), and may subsequently identify individuals who have communicated with these individuals (e.g., using similar voiceprint techniques as described above). For example, the voice analysis platform 102 may identify that the potential bad actor communicated with an individual (e.g., who might not be employed by the financial institution), and that individual communicated with another employee. In this example, the voice analysis platform 102 may be able to identify the other employee. In doing so, the voice analysis platform 102 may further identify impersonation conspiracies between employees (e.g., without being thrown off by an interim communication with an external individual). For example, two employees and a non-employee may conspire amongst each other, without direct communication between the two employees.

In some instances, the voice analysis platform 102 may identify that the potential bad actor is affiliated with a first location of the enterprise organization, and that these communications sessions include one or more employees corresponding to other locations of the enterprise organization, different than the first location. For example, the potential bad actor may be calling in to one or more other branch locations, other than a location at which he or she is employed, and attempting to impersonate another employee or client (e.g., a client with whom he or she previously interacted at the location at which he or she is employed).

With regard to the historical communication sessions, the voice analysis platform 102 may identify processed events (e.g., transactions, fund transfers, and/or other actions) performed during the historical communication sessions. In these instances, the voice analysis platform 102 may flag these processed events as suspicious, and indicate that further review should be performed. In some instances, if the voice analysis platform 102 flags an event as suspicious, the voice analysis platform 102 may flag all other communication sessions that include the corresponding voiceprint (e.g., the voiceprints of any identified bad actors).

At step 221, the voice analysis platform 102 may identify individuals corresponding to voiceprints from these corresponding communication sessions identified at step 220. For example, the voice analysis platform 102 may analyze voice information for the corresponding communication sessions to extract voiceprints, and may subsequently compare these voiceprints to the known voiceprints established at step 207. In doing so, the voice analysis platform 102 may identify voiceprint matches, which may result in identification of these participants in the additional communication sessions (e.g., identification of other bad actors and/or impersonated individuals whose voiceprints were identified at step 220).

In some instances, by analyzing these corresponding voice communication sessions and identifying additional participants as described in steps 220 and 221, the voice analysis platform 102 may, in some instances, be able to detect impersonation between multiple financial centers. For example, the voice analysis platform 102 may identify impersonation by the bad actor at a first financial center, link the bad actor to a second bad actor, and in analysis/monitoring of the second bad actor, and identify impersonation by this second bad actor at a second financial center. In some instances, these financial centers may be in different geographic regions (e.g., California and New York).

Additionally or alternatively, by analyzing these corresponding voice communication sessions, the voice analysis platform 102 may identify patterns of impersonation in a particular region. For example, the voice analysis platform 102 may identify the voiceprint for the bad actor during communication sessions, between the bad actor and other employees, each related to a different account. In this example, the voice analysis platform 102 may identify that the bad actor is attempting to impersonate clients on multiple different accounts. In some instances, the voice analysis platform 102 may identify the same voiceprint (e.g., corresponding to the bad actor) in communications involving different phone numbers (e.g., the bad actor may spoof or otherwise communicate using phone numbers of various individuals who he or she is impersonating).

Figure 2F:
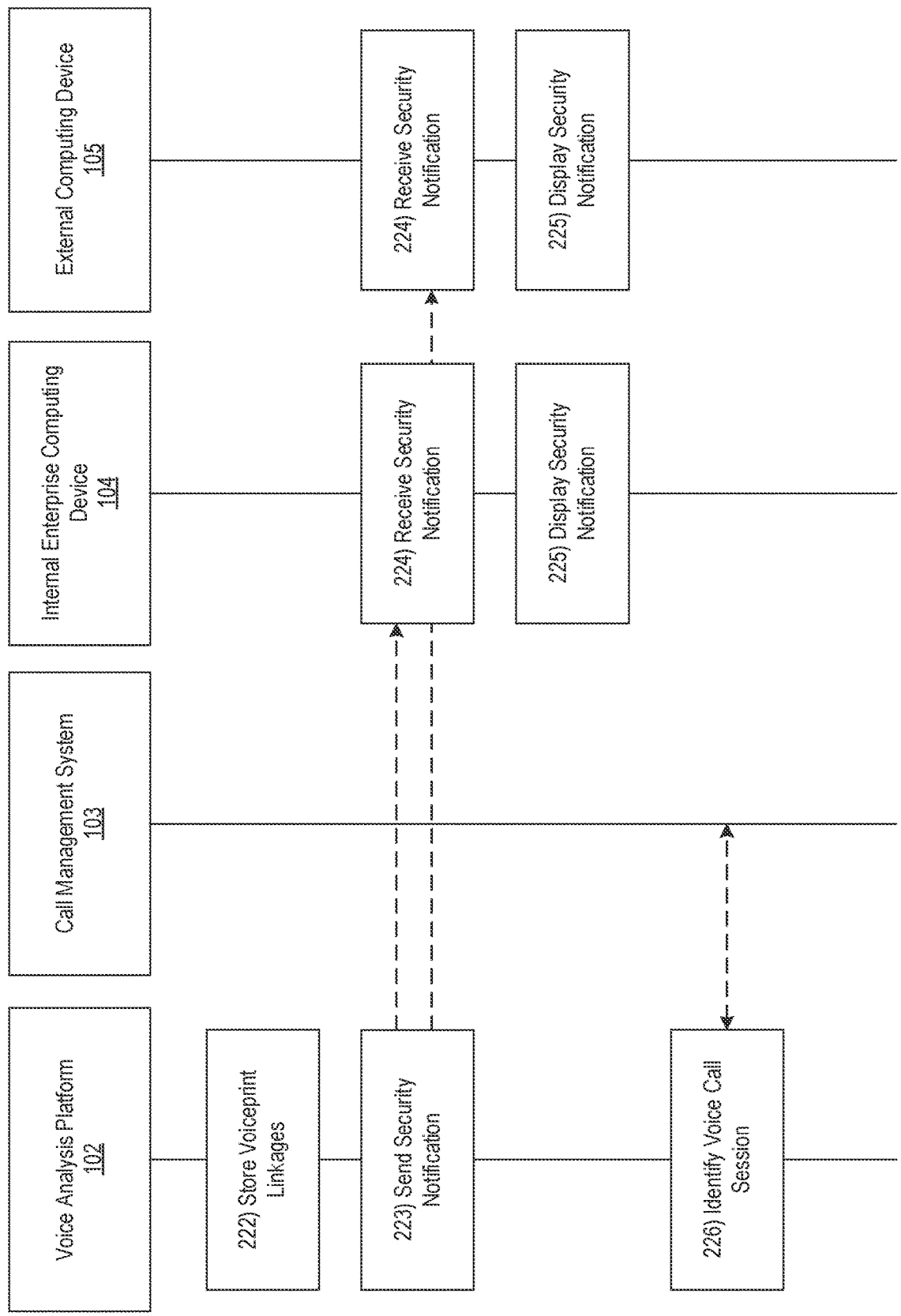

Referring to FIG. 2F, at step 222, the voice analysis platform 102 may store linkages between the voiceprint of the bad actor (the non-matching voiceprint detected at step 215 and the corresponding voiceprints identified at step 221). For example, the voice analysis platform 102 may store the linkages along with the voiceprints established at step 207. In some instances, the voice analysis platform 102 may further store linkages between individuals based on social media and/or other social networks. By storing these linkages, the voice analysis platform 102 may establish datasets that may allow the voice analysis platform 102 to predict or otherwise identify impersonation targets (e.g., target individuals, transactions, accounts, and/or other events) in advance. For example, the voice analysis platform 102 may identify an employee impersonating a first individual, and may predict that the employee may impersonate a family member, friend, co-worker, and/or other individual who may be connected to the first individual. Additionally or alternatively, the voice analysis platform 102 may identify other communication sessions that that the bad actor is involved in, identify accounts corresponding to these communication sessions, search and/or analyze transaction histories on these identified accounts, and/or flag suspicious transactions that may have been initiated by the bad actor (and thus may correspond to an insider threat).

At step 223, the voice analysis platform 102 may send one or more security notifications to the internal enterprise computing device 104 (and/or another internal enterprise computing device) and/or the external computing device 105. For example, the voice analysis platform 102 may send the one or more security notifications to the internal enterprise computing device 104 and/or the external computing device 105 via the communication interface 113 and while the fourth and/or fifth wireless data connections are established. In some instances, the voice analysis platform 102 may send, along with the one or more security notifications, one or more commands directing the internal enterprise computing device and/or the external computing device 105 to display the one or more security notifications. For example, these security notifications may be based on the linkages stored at step 222.

At step 224, the internal enterprise computing device 104 and/or the external computing device 105 may receive the one or more security notifications sent at step 223. For example, the internal enterprise computing device 104 and/or the external computing device 105 may receive the one or more security notifications while the fourth and/or fifth wireless data connections are established. In some instances, the internal enterprise computing device 104 and/or the external computing device 105 may receive, along with the one or more security notifications, the one or more commands directing the internal enterprise computing device 104 and/or the external computing device 105 to display the one or more security notifications.

At step 225, the internal enterprise computing device 104 and/or the external computing device 105 may display the one or more security notifications. For example, the internal enterprise computing device 104 may display a graphical user interface similar to graphical user interface 405, which is shown in FIG. 4. For example, the internal enterprise computing device 104 may display a notification that an employee's permissions have been temporarily suspended as a result of the potential impersonation that has been detected. Additionally or alternatively, the internal enterprise computing device 104 may prompt a user (e.g., the impersonating employee) to reauthenticate using credentials, multistep authentication, and/or other authentication information. Additionally or alternatively, the internal enterprise computing device 104 (or another internal enterprise computing device) may display a notification requesting initiation of a claim or proceeding against the impersonating employee (or alternatively the voice analysis platform 102 and/or internal enterprise computing device 104 may automatically initiate the claim). In some instances, the internal enterprise computing device 104 may display an alert at a financial center based on an identification of the bad actor's presence at the financial center (e.g., detecting voiceprint of the bad actor, identifying a request to access an account linked to the bad actor, and/or otherwise identifying the impersonating actor), and may indicate that the bad actor should not be granted access to an account (and in some instances, may initiate a claim, notify law enforcement, and/or initiate other security measures).

Similarly, in displaying the one or more security notifications the external computing device 105 may display a graphical user interface similar to graphical user interface 505, which is shown in FIG. 5. For example, the external computing device 105 may display a notification that suspicious activity has been detected on the corresponding client's account, and that further confirmation and/or authentication may be required to unlock the account. In some instances, the notifications may be sent to a computing device corresponding to the account holder (e.g., the client). Additionally or alternatively, the notifications may be sent to a computing device corresponding to another individual, other than the account holder, who may be affiliated with the account holder (e.g., a caretaker, parent, next of kin, and/or other individual) indicating suspicious activity.

In some instances, steps 212-225 as described above may be performed in addition to or instead of steps 208-211. For example, in some instances, the voice analysis platform 102 may identify matching voiceprints (e.g., and thus may identify that there is no impersonation occurring in a particular communication session) and in other instances the voice analysis platform 102 may identify non-matching voiceprints (e.g., and thus may identify that there is an impersonation occurring in a particular communication session). At step 226, the voice analysis platform 102 may identify a third communication session (which may e.g., be between one or more internal computing devices such as internal enterprise computing device 104 and one or more external computing devices such as external computing device 105).

Figure 2G:
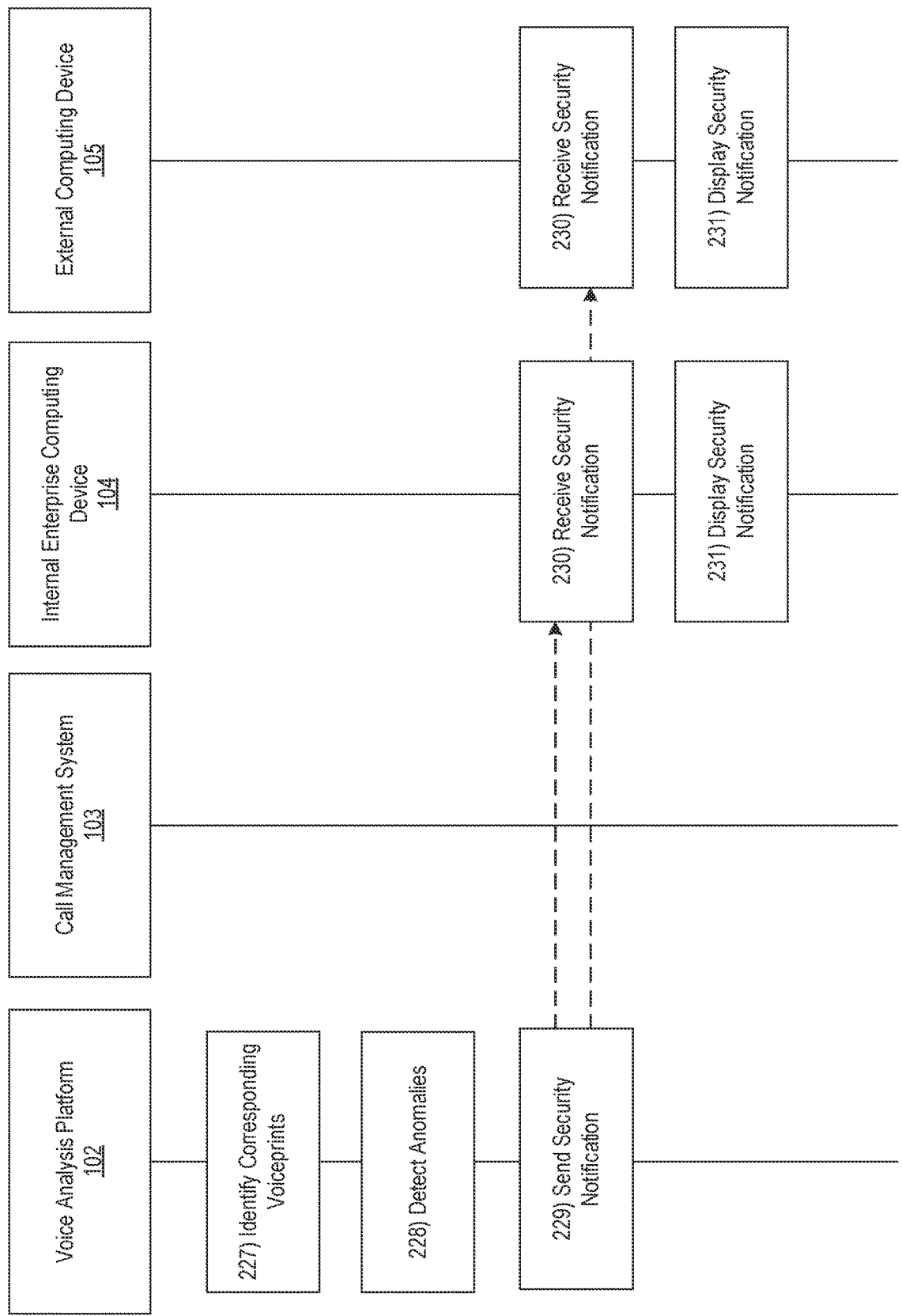

Referring to FIG. 2G, at step 227, the voice analysis platform 102 may identify voiceprints corresponding to the third communication session (e.g., using similar techniques as described above at steps 209, 213, and 221). At step 228, the voice analysis platform 102 may detect one or more anomalies in a voice corresponding to one of the voiceprints identified at step 227. For example, the voice analysis platform 102 may identify that a first employee is participating in the communication session, but is occasionally stuttering in an unanticipated manner (or otherwise speaking in a nervous or otherwise unusual manner for the first employee). In these instances, the voice analysis platform 102 may identify that the first employee may be under duress, performing an illicit activity (and is nervous or otherwise stressed), attempting to impersonate another individual, and/or otherwise performing actions for which security notifications should be sent. For example, the first employee may be being pressured by the bad actor to approve a transaction.

At step 229, the voice analysis platform 102 may send one or more security notifications to the internal enterprise computing device 104 and/or the external computing device 105. For example, the voice analysis platform 102 may send the one or more security notifications to the internal enterprise computing device 104 and/or the external computing device 105 via the communication interface 113 and while the fourth and/or fifth wireless data connections are established. In some instances, the voice analysis platform 102 may send, along with the one or more security notifications, one or more commands directing the internal enterprise computing device and/or the external computing device 105 to display the one or more security notifications. For example, these security notifications may be based on the anomalies detected at step 228.

At step 230, the internal enterprise computing device 104 and/or the external computing device 105 may receive the one or more security notifications sent at step 229. For example, the internal enterprise computing device 104 and/or the external computing device 105 may receive the one or more security notifications while the fourth and/or fifth wireless data connections are established. In some instances, the internal enterprise computing device 104 and/or the external computing device 105 may receive, along with the one or more security notifications, the one or more commands directing the internal enterprise computing device 104 and/or the external computing device 105 to display the one or more security notifications.

At step 231, the internal enterprise computing device 104 and/or the external computing device 105 may display the one or more security notifications. For example, the internal enterprise computing device 104 may display a graphical user interface similar to graphical user interface 405, which is shown in FIG. 4. For example, the internal enterprise computing device 104 may display a notification that an employee's permissions have been temporarily suspended as a result of the potential impersonation that has been detected. Additionally or alternatively, the internal enterprise computing device 104 may prompt a user (e.g., the impersonating employee) to reauthenticate using credentials, multistep authentication, and/or other authentication information. Additionally or alternatively, the internal enterprise computing device 104 (or another internal enterprise computing device) may display a notification requesting initiation of a claim or proceeding against the impersonating employee (or alternatively the voice analysis platform 102 and/or internal enterprise computing device 104 may automatically initiate the claim). Additionally or alternatively, the internal enterprise computing device 104 may prompt a user (e.g., a non-impersonating employee who may be under duress) to enter a duress code in a discrete manner, which may, e.g., allow the employee to indicate that he or she is being forced or otherwise caused to perform one or more tasks against his or her will.

Similarly, in displaying the one or more security notifications the external computing device 105 may display a graphical user interface similar to graphical user interface 505, which is shown in FIG. 5. For example, the external computing device 105 may display a notification that suspicious activity has been detected on the corresponding client's account, and that further confirmation and/or authentication may be required to unlock the account. In some instances, the notifications may be sent to a computing device corresponding to the account holder (e.g., the client). Additionally or alternatively, the notifications may be sent to a computing device corresponding to another individual, other than the account holder, who may be affiliated with the account holder (e.g., a caretaker, parent, next of kin, and/or other individual).

In some instances, in displaying the security notifications, the internal enterprise computing device 104 and/or the external computing device 105 may request an identity confirmation. For example, the external computing device 105 may prompt a customer to confirm a transaction. In these instances, if the external computing device 105 receives a user input indicating that the transaction is not confirmed, the external computing device 105 may notify the voice analysis platform 102, which cause performance of one or more security measures (e.g., stop the transaction, initiate a claim, add a phone number to a hot file list, block online banking, and/or other security measures). In some instances, if the external computing device 105 receive a user input indicating that the transaction is confirmed, the external computing device 105 may notify the voice analysis platform, which may cause the transaction to be approved, and/or store information that may be used as proof that the customer authenticated the transaction (e.g., to prevent future false claims).

Although steps 201-231 are described above with a single internal enterprise computing device 104 and a single external computing device 105, the event sequence may be performed using any number of internal and/or external computing devices without departing from the scope of the disclosure.

Figure 3:
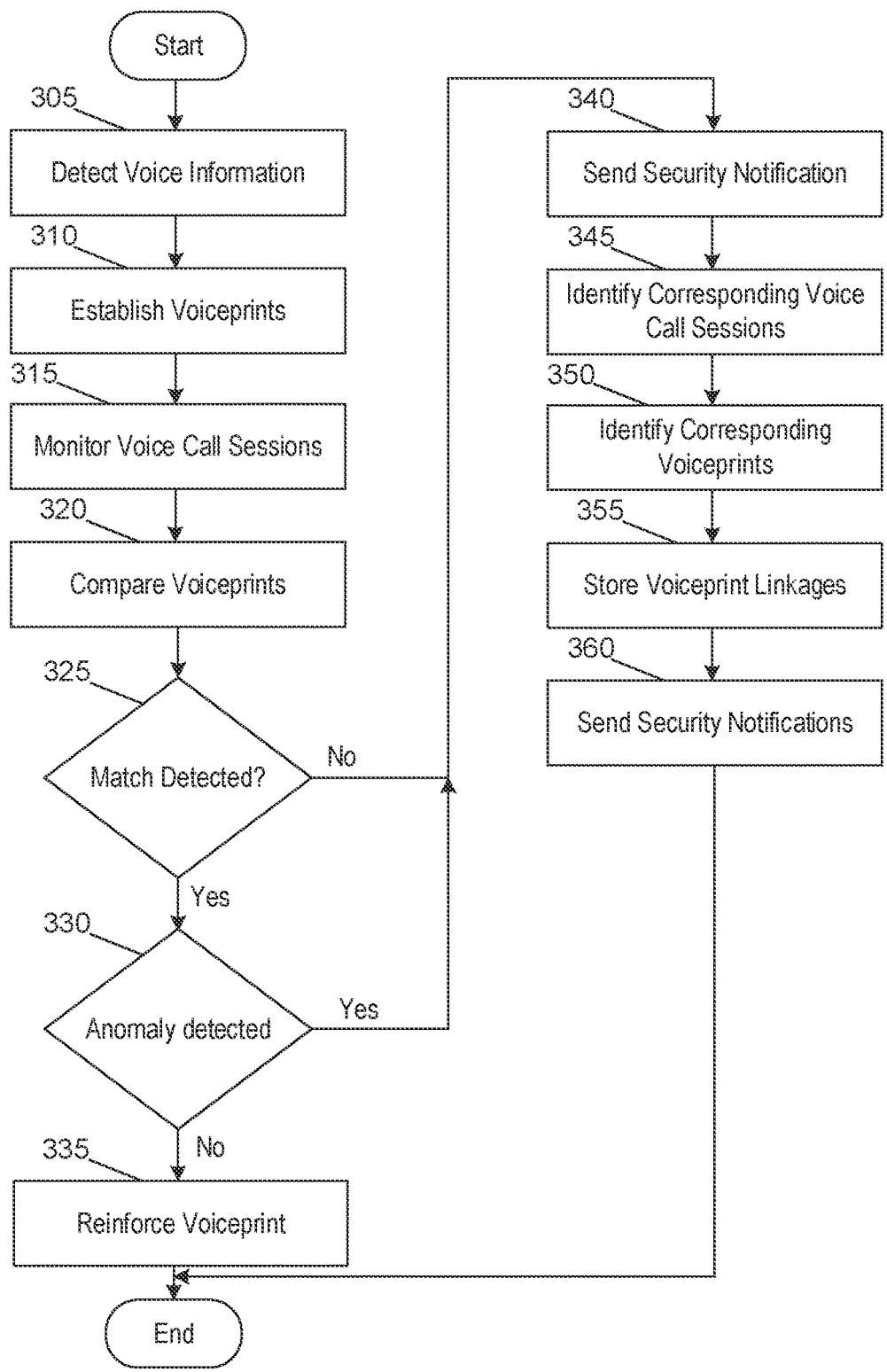
FIG. 3 depicts an illustrative method for implementing voiceprint tracking and anomaly detection in accordance with one or more example embodiments.

FIG. 3 depicts an illustrative method for implementing voiceprint tracking and anomaly detection in accordance with one or more example embodiments. Referring to FIG. 3, at step 305, a computing platform having at least one processor, a communication interface, and memory may detect voice information. At step 310, the computing platform may establish one or more voiceprints based on the detected voice information. At step 315, the computing platform may monitor communication sessions at a call management system 103. At step 320, the computing platform may compare voiceprints detected at step 315 to anticipated voiceprints (e.g., based on the voiceprints established at step 310). At step 325, the computing platform may determine whether or not a match was detected at step 320. If a match is not detected, the computing platform may proceed to step 340. If a match is detected, the computing platform may proceed to step 330.

At step 330, the computing platform may identify whether or not an anomaly was detected in the communication sessions. If an anomaly was detected, the computing platform may proceed to step 340. If an anomaly was not detected, the computing platform may proceed to step 335. At step 335, the computing platform may update one or more models to reinforce the corresponding voiceprints.

At step 340, if a match was not detected at step 320 and/or if an anomaly was detected at step 330, the computing platform may send a security notification to an internal and/or external computing device involved in the corresponding communication session. At step 345, the computing platform may identify other voice call sessions in which an identified bad actor is involved. At step 350, the computing platform may identify voiceprints for other individuals in the other voice call sessions. At step 355, the computing platform may store linkages between the voiceprints identified at step 350 and the voiceprint for the identified bad actor. At step 360, the computing platform may send one or more security notifications based on the stored linkages (e.g., to clients who's accounts may have been accessed or otherwise tampered with by the bad actors and/or affiliates of the bad actors).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   establish voiceprints for one or more employees and one or more clients of an enterprise organization corresponding to a call management system;
   monitor the call management system to detect a voice call session between an employee and a caller attempting to access an account linked to a client;
   identify, based on the voice call session, a first voiceprint corresponding to the employee and a second voiceprint corresponding to the caller;
   compare the first voiceprint corresponding to the employee to a known voiceprint corresponding to the employee;
   detect voice anomalies corresponding to the employee, wherein detecting the voice anomalies comprises:
      determining, by comparing a speech pattern of the first voiceprint corresponding to the employee with a speech pattern of the known voiceprint corresponding to the employee, that the first voiceprint corresponding to the employee does not match the known voiceprint corresponding to the employee, and
      identifying that the first voiceprint corresponding to the employee does not match one of the voiceprints for the one or more employees of the enterprise organization; and
   send, to an enterprise computing device, a security notification indicating potential unauthorized account access and one or more commands directing the enterprise computing device to display the security notification, wherein sending the one or more commands directing the enterprise computing device to display the security notification causes the enterprise computing device to display the security notification.

2. The computing platform of claim 1, wherein establishing the voiceprints for the one or more employees and the voiceprints for the one or more clients is based on one or more of: a pitch, a tone, a stutter, a rate of speech, a speech pattern, or an intonation included in subsets of voice information corresponding to each of the one or more employees and the one or more clients.

3. The computing platform of claim 1, wherein the memory stores additional computer-readable instructions that, when executed by the at least one processor, cause the computing platform to:
   compare the second voiceprint corresponding to the caller to a known voiceprint corresponding to the client;
   determine, based on the comparison of the second voiceprint corresponding to the caller to the known voiceprint corresponding to the client, that the second voiceprint corresponding to the caller does not match the known voiceprint corresponding to the client; and
   identify, based on the second voiceprint corresponding to the caller, that the second voiceprint corresponding to the caller corresponds to another employee of the enterprise organization.

4. The computing platform of claim 3, wherein the memory stores additional computer-readable instructions that, when executed by the at least one processor, cause the computing platform to:
   in response to identifying that the second voiceprint corresponding to the caller corresponds to the other employee of the enterprise organization, initiate a claim against the other employee.

5. The computing platform of claim 3, wherein the memory stores additional computer-readable instructions that, when executed by the at least one processor, cause the computing platform to:
   in response to identifying that the second voiceprint corresponding to the caller corresponds to the other employee of the enterprise organization, revoke enterprise permissions corresponding to the other employee.

6. The computing platform of claim 3, wherein the memory stores additional computer-readable instructions that, when executed by the at least one processor, cause the computing platform to:
   identify an additional voice call session that corresponds to the second voiceprint;
   identify additional voiceprints corresponding to the additional voice call session; and
   store linkage information linking the second voiceprint to the additional voiceprints.

7. The computing platform of claim 6, wherein the memory stores additional computer-readable instructions that, when executed by the at least one processor, cause the computing platform to:
   monitor the call management system to detect additional voice call sessions corresponding to the additional voiceprints; and
   flag requests corresponding to the additional voice call sessions as suspicious.

8. The computing platform of claim 7, wherein the employee corresponds a first location of the enterprise organization, and wherein the additional voice call sessions correspond to other locations, different than the first location, of the enterprise organization.

9. The computing platform of claim 3, wherein the memory stores additional computer-readable instructions that, when executed by the at least one processor, cause the computing platform to:
   identify transactions processed by the other employee; and
   flag the identified transactions for further review.

10. The computing platform of claim 1, wherein the memory stores additional computer-readable instructions that, when executed by the at least one processor, cause the computing platform to:
   compare the first voiceprint corresponding to the employee to a known voiceprint corresponding to the employee; and
   detect voice anomalies corresponding to the employee, wherein detecting the voice anomalies comprises:
      determining, based on the comparison of the first voiceprint corresponding to the employee to the known voiceprint corresponding to the employee, that the first voiceprint corresponding to the employee does not match the known voiceprint corresponding to the employee, and
      identifying that the first voiceprint corresponding to the employee does not match one of the voiceprints for the one or more employees of the enterprise organization.

11. The computing platform of claim 10, wherein the memory stores additional computer-readable instructions that, when executed by the at least one processor, cause the computing platform to:
in response to detecting the voice anomalies:
revoking enterprise permissions corresponding to the employee, and
prompting for re-authentication by the employee to re-instate the revoked enterprise permissions.

12. The computing platform of claim 1, wherein the memory stores additional computer-readable instructions that, when executed by the at least one processor, cause the computing platform to:
detect voice information from the call management system, wherein the voiceprints for the one or more employees and the one or more clients of the enterprise organization are based on the voice information.

13. A method comprising:
at a computing platform comprising at least one processor, a communication interface, and memory:
establishing voiceprints for one or more employees and one or more clients of an enterprise organization corresponding to a call management system;
monitoring the call management system to detect a voice call session between an employee and a caller attempting to access an account linked to a client;
identifying, based on the voice call session, a first voiceprint corresponding to the employee and a second voiceprint corresponding to the caller;
comparing the first voiceprint corresponding to the employee to a known voiceprint corresponding to the employee;
detecting voice anomalies corresponding to the employee, wherein detecting the voice anomalies comprises:
determining, by comparing a speech pattern of the first voiceprint corresponding to the employee with a speech pattern of the known voiceprint corresponding to the employee, that the first voiceprint corresponding to the employee does not match the known voiceprint corresponding to the employee, and
identifying that the first voiceprint corresponding to the employee does not match one of the voiceprints for the one or more employees of the enterprise organization; and
sending, to an enterprise computing device, a security notification indicating potential unauthorized account access and one or more commands directing the enterprise computing device to display the security notification, wherein sending the one or more commands directing the enterprise computing device to display the security notification causes the enterprise computing device to display the security notification.

14. The method of claim 13, wherein establishing the voiceprints for the one or more employees and the voiceprints for the one or more clients is based on one or more of: a pitch, a tone, a stutter, a rate of speech, a speech pattern, or an intonation included in subsets of voice information corresponding to each of the one or more employees and the one or more clients.

15. The method of claim 13, further comprising:
comparing the second voiceprint corresponding to the caller to a known voiceprint corresponding to the client;

determining, based on the comparison of the second voiceprint corresponding to the caller to the known voiceprint corresponding to the client, that the second voiceprint corresponding to the caller does not match the known voiceprint corresponding to the client; and
identifying, based on the second voiceprint corresponding to the caller, that the second voiceprint corresponding to the caller corresponds to another employee of the enterprise organization.

16. The method of claim 15, further comprising:
in response to identifying that the second voiceprint corresponding to the caller corresponds to the other employee of the enterprise organization, initiating a claim against the other employee.

17. The method of claim 15, further comprising:
in response to identifying that the second voiceprint corresponding to the caller corresponds to the other employee of the enterprise organization, revoking enterprise permissions corresponding to the other employee.

18. The method of claim 15, further comprising:
identifying an additional voice call session that corresponds to the second voiceprint;
identifying additional voiceprints corresponding to the additional voice call session; and
storing linkage information linking the second voiceprint to the additional voiceprints.

19. The method of claim 18, further comprising:
monitoring the call management system to detect additional voice call sessions corresponding to the additional voiceprints; and
flagging requests corresponding to the additional voice call sessions as suspicious.

20. One or more non-transitory computer-readable media storing instructions that, when executed by a computing platform comprising at least one processor, a communication interface, and memory, cause the computing platform to:
establish voiceprints for one or more employees and one or more clients of an enterprise organization corresponding to a call management system;
monitor the call management system to detect a voice call session between an employee and a caller attempting to access an account linked to a client;
identify, based on the voice call session, a first voiceprint corresponding to the employee and a second voiceprint corresponding to the caller;
compare the first voiceprint corresponding to the employee to a known voiceprint corresponding to the employee;
detect voice anomalies corresponding to the employee, wherein detecting the voice anomalies comprises:
determining, by comparing a speech pattern of the first voiceprint corresponding to the employee with a speech pattern of the known voiceprint corresponding to the employee, that the first voiceprint corresponding to the employee does not match the known voiceprint corresponding to the employee, and
identifying that the first voiceprint corresponding to the employee does not match one of the voiceprints for the one or more employees of the enterprise organization; and
send, to an enterprise computing device, a security notification indicating potential unauthorized account access and one or more commands directing the enterprise computing device to display the security notification, wherein sending the one or more commands directing the enterprise computing device to display the security notification causes the enterprise computing device to display the security notification.

\* \* \* \* \*